US012455648B2

United States Patent
Chang et al.

(10) Patent No.: US 12,455,648 B2
(45) Date of Patent: Oct. 28, 2025

(54) INSPECTION TOOL AND INSPECTION METHOD FOR A TOUCH PLATE

(71) Applicant: E Ink Holdings Inc., Hsinchu (TW)

(72) Inventors: Chien-Hsing Chang, Hsinchu (TW); Ying-Ta Chen, Hsinchu (TW); Yun-Nan Hsieh, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/961,464

(22) Filed: Nov. 27, 2024

(65) Prior Publication Data

US 2025/0093989 A1 Mar. 20, 2025

Related U.S. Application Data

(63) Continuation of application No. 18/153,998, filed on Jan. 12, 2023, now abandoned.

(30) Foreign Application Priority Data

Mar. 17, 2022 (TW) .................................. 111109828

(51) Int. Cl.
| | | |
|---|---|---|
| *G06F 3/041* | (2006.01) | |
| *G06F 3/039* | (2013.01) | |
| *G06F 3/046* | (2006.01) | |

(52) U.S. Cl.
CPC .......... *G06F 3/0416* (2013.01); *G06F 3/0393* (2019.05); *G06F 3/046* (2013.01)

(58) Field of Classification Search
None
See application file for complete search history.

(56) References Cited

U.S. PATENT DOCUMENTS

2018/0364832 A1* 12/2018 Kong .................. G06F 3/04166
2020/0333939 A1* 10/2020 Nomura .................. G06F 3/044
2023/0297184 A1* 9/2023 Chang ..................... G06F 3/046
                                                              345/174

* cited by examiner

*Primary Examiner* — Stephen T. Reed
(74) *Attorney, Agent, or Firm* — JCIPRNET

(57) ABSTRACT

Provided is an inspection tool for a touch panel, including a substrate adapted to be placed on the touch panel and multiple protrusions disposed on the substrate in correspondence to multiple touch inspection points and arranged along an inspection trajectory. An inspection method for a touch panel is also provided.

11 Claims, 3 Drawing Sheets

INSPECTION TOOL AND INSPECTION METHOD FOR A TOUCH PLATE

CROSS-REFERENCE TO RELATED APPLICATION

This is a continuation of and claims the priority benefit of a prior application Ser. No. 18/153,998, filed on Jan. 12, 2023, now pending, which claims the priority benefit of Taiwan application serial no. 111109828, filed on Mar. 17, 2022. The entirety of the above-mentioned patent application is hereby incorporated by reference herein and made a part of this specification.

BACKGROUND

Technical Field

The disclosure relates to an inspection tool and an inspection method, and more particularly to an inspection tool for a touch panel and an inspection method for a touch panel.

Description of Related Art

Various improved touch technologies have greatly enhanced the convenience of electronic products. However, in application scenarios of writing, touch operations by hand may not achieve ideal resolution, so touch applications with a stylus are still important. Despite that, during writing operations with a stylus, the stylus and a palm may contact a writing surface at the same time. Therefore, a technology to exclude the influence of the palm is important, and electromagnetic touch technology is a touch technology that uses a stylus for touch operations and can eliminate false detection caused by a palm.

SUMMARY

The disclosure provides an inspection tool for a touch panel that helps improve inspection efficiency.

The disclosure provides an inspection method for a touch panel with simple inspection steps.

The inspection tool for the touch panel in the embodiments of the disclosure includes a substrate adapted to be placed on the touch panel and multiple protrusions disposed on the substrate and arranged along an inspection trajectory.

In an embodiment of the disclosure, the inspection trajectory is annular or linear.

In an embodiment of the disclosure, a height of each protrusion varies along the inspection trajectory.

In an embodiment of the disclosure, the height gradually increases and then gradually decreases along the inspection trajectory.

In an embodiment of the disclosure, the height gradually increases and then remains unchanged along the inspection trajectory.

In an embodiment of the disclosure, a width of each protrusion measured along the inspection trajectory is greater than or equal to 2 millimeters.

The inspection method for the touch panel in the embodiments of the disclosure includes the following steps. An inspection tool is installed on a touch panel. The inspection tool includes a substrate and multiple protrusions. The protrusions are disposed on the substrate and arranged along an inspection trajectory. A stylus moves on the inspection tool along the inspection trajectory to pass through the protrusions.

In an embodiment of the disclosure, moving the stylus on the inspection tool along the inspection trajectory makes a touch tip of the stylus pressed by the protrusion and causes the stylus to send a signal.

In an embodiment of the disclosure, the touch panel is adapted to sense the signal sent by the stylus.

In an embodiment of the disclosure, a speed of the stylus moving on the inspection tool along the inspection trajectory ranges from 10 millimeters/second to 50 millimeters/second.

Based on the above, the inspection tool and the inspection method for the touch panel in the embodiments of the disclosure use the protrusions disposed on the substrate to define inspection points to realize efficient touch panel inspection.

BRIEF DESCRIPTION OF THE DRAWINGS

FIG. 3 and FIG. 4 schematically show the layout relationship of sensing channels of the touch panel and inspection points of the inspection tool.

DESCRIPTION OF THE EMBODIMENTS

Figure 1:
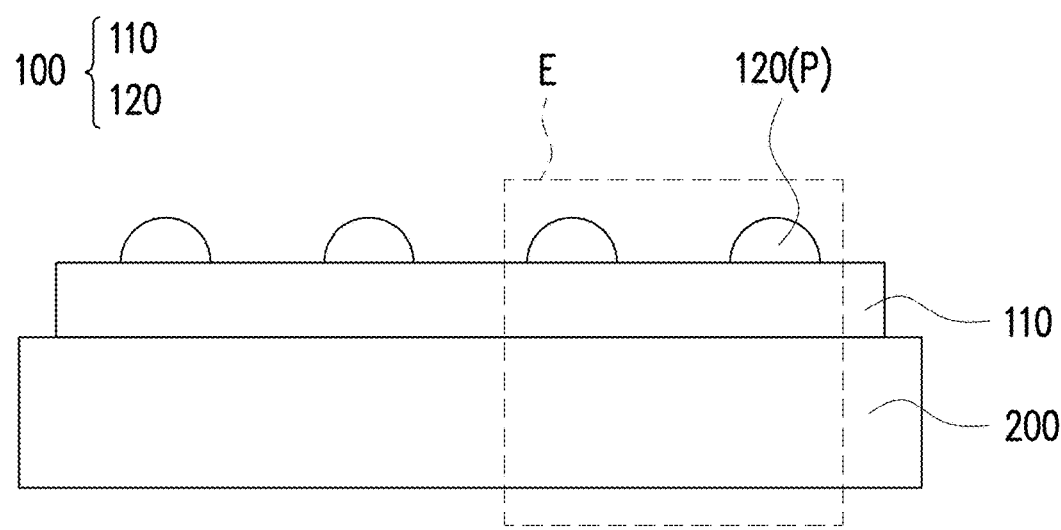
FIG. 1 is a schematic view of an inspection tool for a touch panel according to an embodiment of the disclosure.

FIG. 1 is a schematic view of an inspection tool for a touch panel according to an embodiment of the disclosure. An inspection tool 100 includes a substrate 110 and multiple protrusions 120, and FIG. 1 shows the substrate 110 and the protrusion 120 in a side view. The inspection tool 100 may optionally include other components, but FIG. 1 only shows the substrate 110 and the protrusions 120 to facilitate description. In this embodiment, the protrusions 120 are disposed on the substrate 110. In some embodiments, the protrusions 120 may be arranged according to positions where inspection takes place, and the positions of the protrusions 120 may be regarded as inspection points P. In addition, the substrate 110 is adapted to be placed on a touch panel to be inspected (e.g., an electromagnetic touch panel 200), as shown in FIG. 1. In some embodiments, the touch panel to be inspected is, for example, the electromagnetic touch panel 200, but the disclosure is not limited thereto.

The substrate 110 may be a supporting plate, such as a rigid substrate. The protrusions 120 can be temporarily or permanently fixed on the substrate 110. The substrate 110 and the protrusions 120 may be the same material or different materials. The material for the substrate 110 and the protrusions 120 is a material allowing magnetic field lines to pass through. The material for the substrate 110 and the protrusions 120 is a non-conductive material and excludes any metal materials to avoid affecting electromagnetic inspection results. In some embodiments, the non-conductive material of the substrate 110 and the protrusions 120 include a plastic material such as poly (methyl methacrylate) (PMMA), polyethylene terephthalate (PET), polycarbonate (PC), polyethylene (PE) or the like. In some embodiments, the substrate 110 and the protrusions 120 may be integrally formed without any structural boundary in between. For example, the substrate 110 and the protrusions 120 may be formed integrally by molding. In other words, the substrate 110 and the protrusions 120 may be fabricated through the same molding process so that the non-conductive material continuously extends between the substrate 110 and the protrusions 120. In some embodiments, the protrusions 120 may be attached on the substrate 110 with an adhesive material. In some embodiments, the protrusions 120 may be fixed on the substrate 110 by fastening. In some embodiments, the protrusions 120 may be disposed on the substrate 110 in a detachable fixing manner.

The protrusions 120 disposed on the substrate 110 may have certain stability and are not easily stripped from the substrate 110. In other words, even if the protrusions 120 are detachably disposed on the substrate 110, the protrusions 120 disposed on the substrate 110 can still bear a certain external force and is not easily stripped. In addition, the layout of how the protrusions 120 are arranged on the substrate 110 may be determined according to the setting of the inspection points. If the protrusions 120 are disposed on the substrate 110 in a detachable fixing manner, the layout of how the protrusions 120 are arranged may be adjusted according to each inspection requirement. Therefore, the inspection tool 100 is flexibly adjustable and is adapted for different inspection applications.

Figure 2:
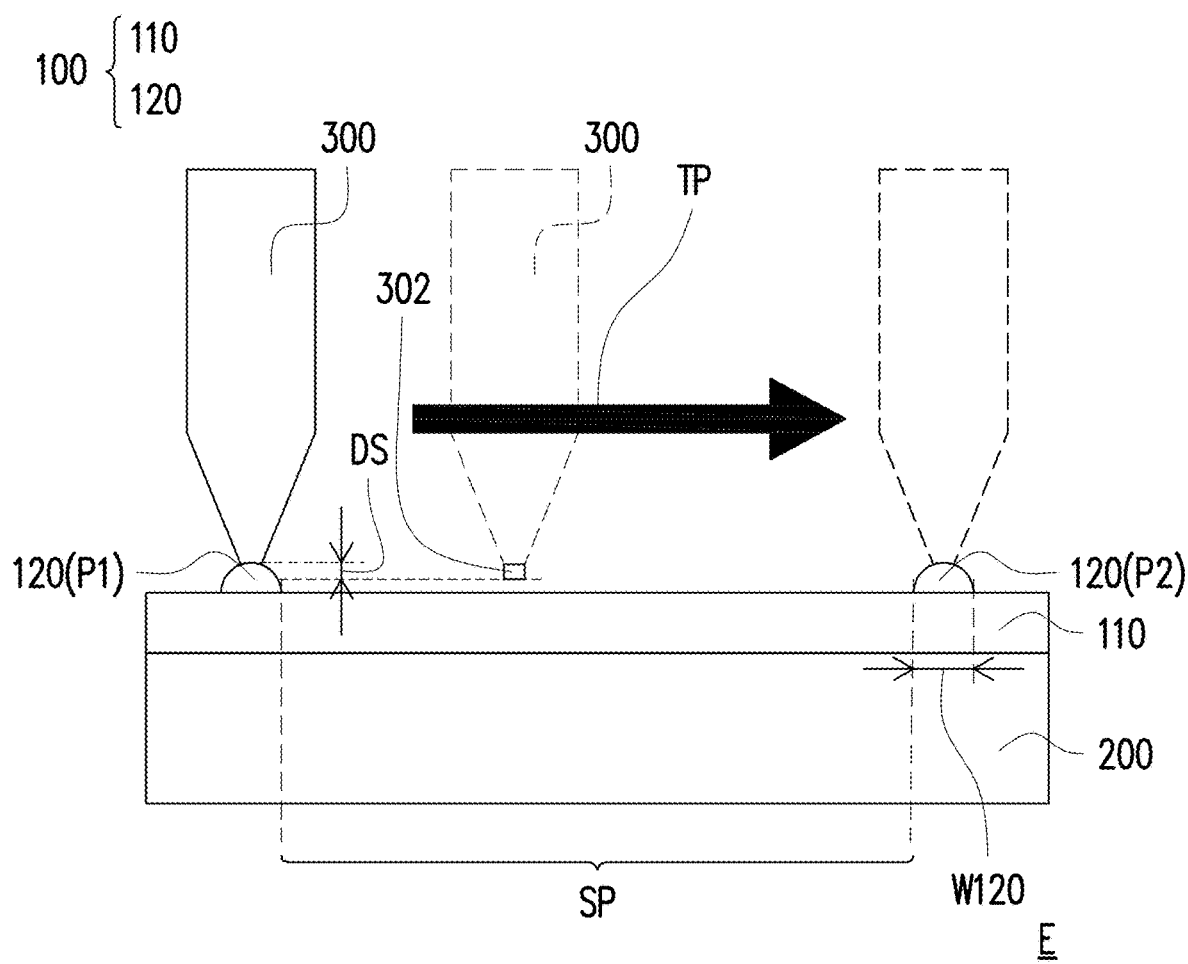
FIG. 2 schematically shows an inspection method of an electromagnetic touch panel according to an embodiment of the disclosure.

FIG. 2 schematically shows an inspection method of a touch panel according to an embodiment of the disclosure. FIG. 2 uses the inspection tool 100 of FIG. 1 to inspect the electromagnetic touch panel 200, and FIG. 2 corresponds to an area E in FIG. 1. Therefore, the same reference numerals in FIG. 1 and FIG. 2 are used to denote the same components. When the electromagnetic touch panel 200 is to be inspected, the inspection tool 100 may be installed on the electromagnetic touch panel 200 first. The inspection tool 100 includes the substrate 110 and the protrusions 120, and the protrusions 120 are arranged along an inspection trajectory TP. The substrate 110 may be placed on the electromagnetic touch panel 200, such that the substrate 110 is located between the electromagnetic touch panel 200 and the protrusions 120. Next, a stylus 300 moves on the inspection tool 100 along the inspection trajectory TP to pass through the protrusions 120. In some embodiments, the moving speed of the stylus 300 on the inspection tool 100 along the inspection trajectory TP may range from 10 millimeters/second to 50 millimeters/second, but the disclosure is not limited thereto. After inspection, the inspection tool 100 may be moved away from the electromagnetic touch panel 200 to complete the inspection operation. After inspection, the electromagnetic touch panel 200 determined to be qualified in combination with a display panel may serve as a touch display device for use alone or for integration into other electronic products.

In some embodiments, the stylus 300 may have a touch tip 302. When the touch tip 302 is pressed, the stylus 300 is prompted to send a signal, which is valid for inspection. When the touch tip 302 is not pressed, the stylus 300 does not send a signal, which is invalid for inspection. In some other embodiments, the stylus 300 continuously sends signals, and the touch tip 302 is pressed to different degrees. For example, when the touch tip 302 is pressed to a relatively great degree at a position with a bump, signals are determined as valid; when the touch tip 302 is pressed to a relatively small degree or is not pressed at a position without a bump, signals are determined as invalid. In addition, the stylus 300 may send different signals. The signals sent by the stylus 300 are signals that can be sensed by the electromagnetic touch panel 200, such as electromagnetic signals. Therefore, during the movement of the stylus 300, the electromagnetic touch panel 200 may sense the corresponding signals to inspect whether sensing channels of the electromagnetic touch panel 200 are normal.

The inspection points defined by two protrusions 120 in FIG. 2 are respectively denoted as an inspection point P1 and an inspection point P2 herein for description. With reference to FIG. 2, when moving on the inspection tool 100 along the inspection trajectory TP, the stylus 300 may at least pass through the protrusion 120 defining the inspection point P1 and the protrusion 120 defining the inspection point P2. In this embodiment, the pressed state of the touch tip 302 varies as the stylus 300 moves on the inspection tool 100 along the inspection trajectory TP. Therefore, the signals sensed by the touch electromagnetic panel 200 may be used to determine inspection results. For example, since the protrusions 120 are relatively protruding structures on the substrate 110, moving the stylus 300 on the inspection tool 100 along the inspection trajectory TP can make the touch tip 302 of the stylus 300 pressed by the protrusions 120 at the inspection point P1 and the inspection point P2 and cause the stylus 300 to send a signal. Therefore, when the stylus 300 moves to the inspection point P1 and the inspection point P2, the electromagnetic touch panel 200 receives the signal sent by the stylus 300.

The inspection method in this embodiment may determine whether the electromagnetic touch panel 200 is normal according to the signal received by the electromagnetic touch panel 200. For example, if the sensing result of the electromagnetic touch panel 200 shows that there are signals corresponding to the movement of the stylus 300 to the inspection point P1 and the inspection point P2, then the sensing channels corresponding to the inspection point P1 and the inspection point P2 function normally. If the sensing result of the electromagnetic touch panel 200 shows that there is no signal corresponding to the movement of the stylus 300 to at least one of the inspection point P1 and the inspection point P2, then the sensing channel corresponding to at least one of the inspection point P1 and the inspection point P2 does not function normally. With the above inspection method, it may be inspected whether the electromagnetic touch panel 200 is a qualified product.

In some embodiments, a width W120 of the protrusion 120 measured along the inspection trajectory TP may be designed to ensure that the touch tip 302 keeps being pressed by the protrusion 120 during the process of the stylus 300 moving on the protrusion 120 for 2 millimeters or an even longer distance. For example, the width W120 of the protrusion 120 measured along the inspection trajectory TP is 2 millimeters, but the disclosure is not limited to the above. The width W120 may be designed to be any number in the appropriate range of 1 to 3 millimeters. In addition, regarding the relative height of the stylus 300 during inspection, a distance DS between the height of the touch tip 302 of the stylus 300 when not pressed and the top surface of the protrusion 120 may be designed to be equal to or greater than the compressible distance of the touch tip 302 of the stylus 300. The distance DS is, for example, 1 millimeter, but the disclosure is not limited thereto.

In addition, in some embodiments, moving the stylus 300 on the inspection tool 100 along the inspection trajectory TP makes the touch tip 302 of the stylus 300 not pressed when the touch tip 302 moves away from the protrusions 120. As shown in FIG. 2, when the stylus 300 is located in a spacing section SP between the protrusions 120, the touch tip 302 may not contact the substrate 110 and thus not be pressed. When the stylus 300 is located in the spacing section SP, the stylus 300 does not send a signal. Therefore, during the movement of the stylus 300 on the inspection tool 100 along the inspection trajectory TP, the stylus 300 only sends signals when located at the inspection point P1 and the inspection point P2. The electromagnetic touch panel 200 may determine whether the sensing channels corresponding to the inspection point P1 and the inspection point P2 function normally according to whether the signals are inspected. In another embodiment, the stylus 300 continues to send signals, which are determined as valid signals by the electromagnetic touch panel 200 only when the stylus 300 is located at the inspection point P1 and the inspection point P2 and are determined as invalid signals by the electromagnetic touch panel 200 during the movement along the inspection trajectory TP. In other words, only valid signals are used to determine whether the sensing channels are normal.

In some embodiments, when the stylus 300 is located in the spacing section SP between the protrusions 120, the touch tip 302 may be pressed against the substrate 110. However, the touch tip 302 is pressed in the spacing section SP to a degree less than being pressed at the protrusion 120, such that the stylus 300 may send different signals (e.g., signals with different electromagnetic field sizes) in the spacing section SP and at the protrusion 120. Since the signals sent by the stylus 300 at the inspection point P1 and the inspection point P2 and the signals sent by the stylus 300 in the spacing section SP are distinguishable, the electromagnetic touch panel 200 may determine whether the sensing channels corresponding to the inspection point P1 and the inspection point P2 are normal according to the inspected signal differences.

When there is no inspection tool 100, the touch tip 302 keeps being pressed during the movement of the stylus 300 along the inspection trajectory TP, such that the stylus 300 still sends signals when located in the spacing section SP. In addition, when the stylus 300 is located at different positions, there may be no significant difference in the degree to which the touch tip 302 is pressed. In this way, the electromagnetic touch panel 200 may not be able to correctly distinguish the signals corresponding to the inspection points, or may even wrongly determine that there are other inspection points in the spacing section SP, which results in incorrect inspection results. Additional inspection steps are necessary to solve the problem, such as using the stylus 300 to press each inspection point to determine whether the corresponding inspection channel is normal. Therefore, without the inspection tool 100, the inspection method of the electromagnetic touch panel 200 may at least require an inspection step of continuously moving the stylus 300 (e.g., drawing a line) along the inspection trajectory TP as well as an inspection step of pressing individual inspection points with the stylus 300. With the inspection tool 100, as shown in the embodiment of FIG. 2, the correct inspection results can be obtained by only adopting the inspection step of continuously moving the stylus 300 along the inspection trajectory TP. In other words, the inspection tool 100 helps improve the inspection efficiency of the electromagnetic touch panel 200.

Figures 3, 4:
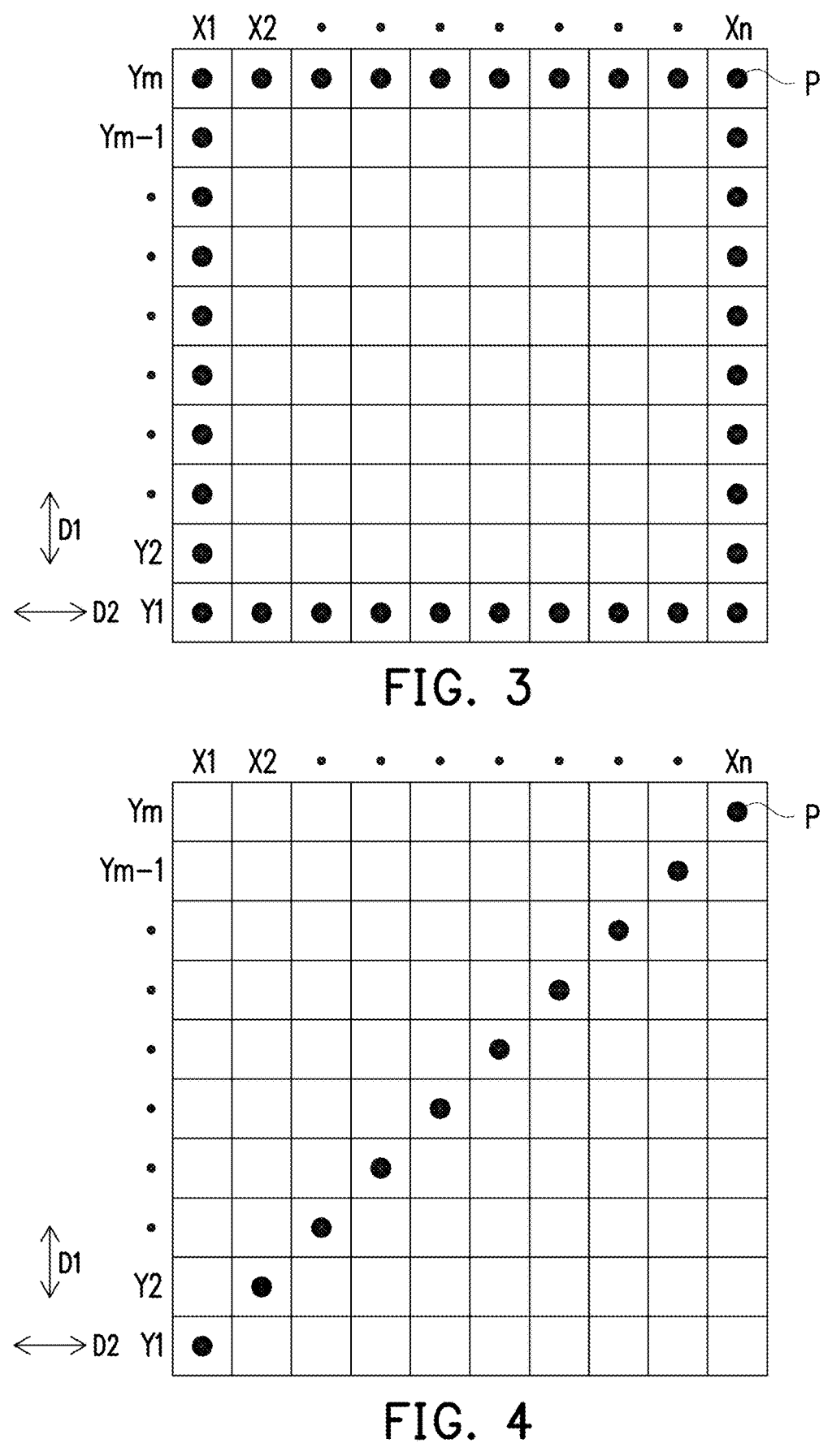

FIG. 3 and FIG. 4 schematically show the layout relationship of sensing channels of the electromagnetic touch panel and inspection points of the inspection tool 100. In some embodiments, as shown in FIG. 3 and FIG. 4, the electromagnetic touch panel has n first sensing channels X1 to Xn and m second sensing channels Y1 to Ym−1 and Ym, where n and m are positive integers. Each of the first sensing channels X1 to Xn, for example, extends along a first direction D1, and each of the second sensing channels Y1 to Ym, for example, extends along a second direction D2. The first direction D1 and the second direction D2 intersect so that the first sensing channels X1 to Xn and the second sensing channels Y1 to Ym establish a sensing array. When the inspection tool 100 of FIG. 1 is used to inspect the electromagnetic touch panel 200, the protrusions 120 of the inspection tool 100 may be correspondingly disposed at the positions of the inspection points P. In other words, the layout of the inspection points P in FIG. 3 and FIG. 4 may be regarded as the layout of the protrusions 120 of the inspection tool 100.

In FIG. 3, the inspection points P may be disposed on the first one and the last one of the first sensing channels X1 to Xn and the second sensing channels Y1 to Ym, such as being disposed along the first sensing channel X1, the first sensing channel Xn, the second sensing channel Y1, and the second sensing channel Ym. In this way, the inspection points P may be arranged into a ring, meaning that the corresponding inspection trajectory TP (FIG. 2) is annular. In FIG. 4, the number of the first sensing channels X1 to Xn and the number of the second sensing channels Y1 to Ym are the same, which means n is equal to m, and the inspection points P may be arranged into a line. In other words, the corresponding inspection trajectory TP (FIG. 2) is linear and arranged diagonally. For example, the inspection points P are, for example, disposed at positions (Xi,Yi), where i is 1 to n (or m). The layout design of the inspection points P of FIG. 3 and FIG. 4 allows all sensing channels to be inspected, and the number of the inspection points P is less than the number of the sensing channels, but the disclosure is not limited thereto.

In addition, the layout design of the inspection points P of FIG. 3 and FIG. 4 may be used with the inspection method of FIG. 2 for inspection. For example, when the inspection points P are disposed as shown in FIG. 3, the inspection method of the electromagnetic touch panel may be moving the stylus along an annular trajectory surrounded by the inspection points P, which means the annular trajectory surrounded by the inspection points P may serve as the inspection trajectory TP in FIG. 2. When the inspection points P are disposed as shown in FIG. 4, the inspection method of the electromagnetic touch panel may be moving the stylus along a linear trajectory arranged by the inspection points P, which means the inspection trajectory TP in FIG. 2 may be the linear trajectory arranged by the inspection points that line up. However, the inspection point layouts in FIG. 3 and FIG. 4 are only exemplary and should by no means limit the implementation of the disclosure.

Figure 5:
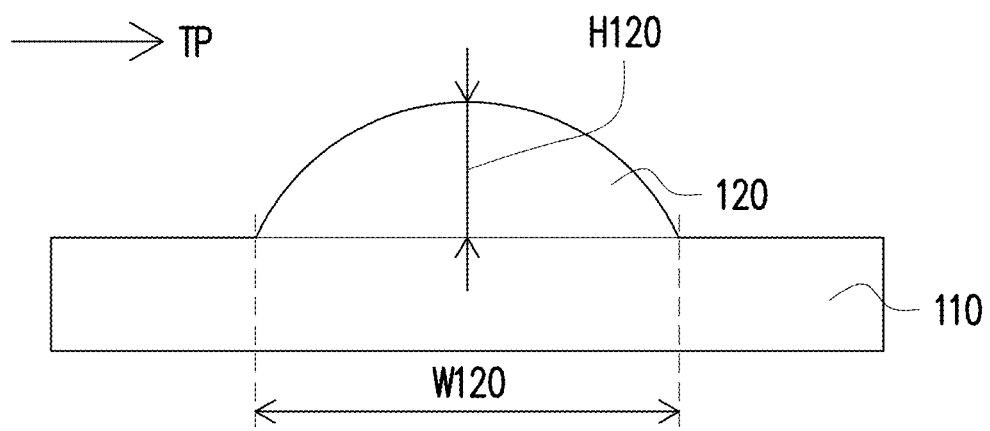
FIG. 5 and FIG. 6 are schematic side views of protrusions in different embodiments.
Figure 6:
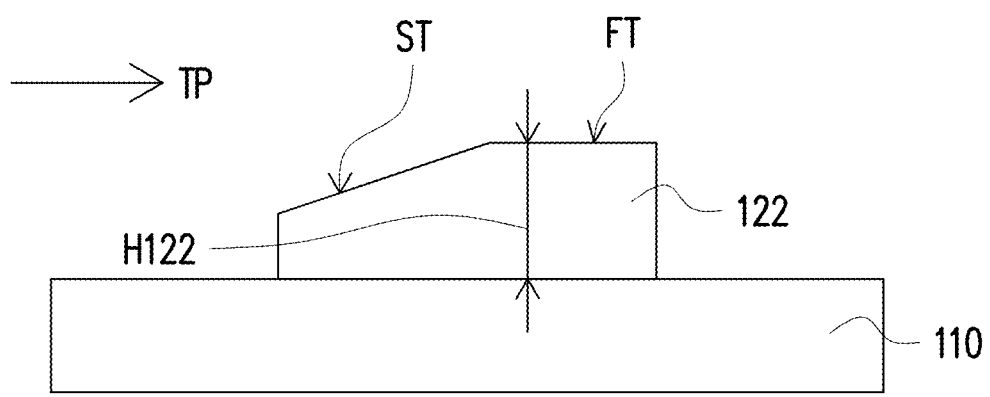

FIG. 5 and FIG. 6 are schematic side views of protrusions in different embodiments, and any protrusion in FIG. 5 and FIG. 6 may be applied to the inspection tool of FIG. 1. In FIG. 5, the width W120 of the protrusion 120 measured along the inspection trajectory TP may be greater than or equal to 2 millimeters, and the width W120 may be designed to be any number in the appropriate range of 1 to 3 millimeters. A height H120 of the protrusion 120 disposed on the substrate 110 may vary along the inspection trajectory TP, and the height H120 may gradually increase and then gradually decrease along the inspection trajectory TP. In FIG. 5, the height H120 may vary along the inspection trajectory TP at an unfixed rate, but the disclosure is not limited thereto. For example, the protrusion 120 of FIG. 5 has a hemispherical outline.

In FIG. 6, a height H122 of a protrusion 122 disposed on the substrate 110 may vary along the inspection trajectory TP, and the height H122 gradually increases along the inspection trajectory TP and then remains unchanged. In FIG. 6, the height H122 may increase along the inspection trajectory TP at a fixed rate, so the protrusion 122 has a sloping top surface portion ST and a flat top surface portion FT. For example, the outline of the protrusion 122 of FIG. 6 has a chamfer, but the disclosure is not limited thereto.

In some embodiments, when the protrusion 122 is applied to the inspection method shown in FIG. 2, the movement of the stylus 300 along the inspection trajectory TP may first contact the sloping top surface portion ST and then contact the flat top surface portion FT before the stylus 300 leaves the flat top surface portion FT. The sloping top surface portion ST may gradually increase the stress of the touch tip 302 of the stylus 300 being pressed to make the movement of the stylus 300 smooth and fluid. Similarly, the protrusion 120 of FIG. 5 may also provide a gradually raised top surface, which facilitates the smooth and fluid movement of the stylus 300. However, FIG. 5 and FIG. 6 are only exemplary for the protrusion appearance and should by no means limit the implementation of the disclosure.

In summary, the inspection tool in the embodiments of the disclosure is disposed with multiple protrusions arranged along the inspection trajectory to define the inspection points. When moving along the inspection trajectory, the stylus may contact the protrusions and let the touch tip be pressed, thereby generating valid signals for the electromagnetic touch panel to sense. When the stylus leaves the protrusions, the touch tip is not pressed and generates no signal, or the touch tip is pressed to a less degree and generates different signals. Therefore, different signals are generated during the movement of the stylus between the protrusions along the inspection trajectory, which may improve inspection accuracy. Moreover, the inspection step of continuously moving the stylus to draw a line may complete the inspection of the electromagnetic touch panel, thereby improving the inspection efficiency of the electromagnetic touch panel.

What is claimed is:

1. An inspection tool for a touch panel, comprising:
a substrate, adapted to be placed on the touch panel; and
a plurality of protrusions, protruded from a surface of the substrate in correspondence to a plurality of touch inspection points and arranged along an inspection trajectory,
wherein the substrate and the protrusions form from a one-piece structure of a material without a structural boundary in between, and
wherein the material is non-conductive and allows magnetic field lines to pass through.

2. The inspection tool for the touch panel according to claim 1, wherein the inspection trajectory is annular or linear.

3. The inspection tool for the touch panel according to claim 1, wherein a height of each of the protrusions varies along the inspection trajectory.

4. The inspection tool for the touch panel according to claim 3, wherein the height gradually increases and then gradually decreases along the inspection trajectory.

5. The inspection tool for the touch panel according to claim 3, wherein the height gradually increases and then remains unchanged along the inspection trajectory.

6. The inspection tool for the touch panel according to claim 1, wherein a width of each of the protrusions measured along the inspection trajectory is greater than or equal to 1 millimeter and is less than or equal to 3 millimeters.

7. The inspection tool for the touch panel according to claim 1, wherein the touch panel is adapted to sense a signal from a stylus, and the inspection tool is interposed between the touch panel and the stylus to provide a non-conductive space between the touch panel and the stylus.

8. An inspection method for a touch panel, comprising:
installing an inspection tool onto the touch panel, wherein the inspection tool comprises:
a substrate; and
a plurality of protrusions, disposed on the substrate in correspondence to a plurality of touch inspection points and arranged along an inspection trajectory; and
moving a stylus along the inspection trajectory on the inspection tool to pass through the protrusions,
wherein the inspection tool is interposed between the touch panel and the stylus to provide a non-conductive space between the touch panel and the stylus.

9. The inspection method for the touch panel according to claim 8, wherein moving the stylus on the inspection tool along the inspection trajectory makes a touch tip of the stylus pressed by the protrusions and causes the stylus to send a valid signal.

10. The inspection method for the touch panel according to claim 9, wherein the touch panel is adapted to sense the valid signal sent by the stylus.

11. The inspection method for the touch panel according to claim 8, wherein a speed of the stylus moving on the inspection tool along the inspection trajectory ranges from 10 millimeters/second to 50 millimeters/second.

\* \* \* \* \*